United States Patent [19]
Koike et al.
[11] Patent Number: 4,849,770
[45] Date of Patent: Jul. 18, 1989

[54] INK FOR USE IN INK JET AND INK JET PRINTING METHOD USING THE SAME

[75] Inventors: Shoji Koike; Kazuo Iwata, both of Yokohama; Yasuko Tomida, Atsugi, all of Japan

[73] Assignee: Canon Kabushiki Kaisha, Tokyo, Japan

[21] Appl. No.: 936,785

[22] Filed: Dec. 2, 1986

[30] Foreign Application Priority Data

| | | | |
|---|---|---|---|
| Dec. 13, 1985 | [JP] | Japan | 60-279134 |
| Dec. 13, 1985 | [JP] | Japan | 60-279135 |
| Jan. 10, 1986 | [JP] | Japan | 61-1968 |
| Jan. 10, 1986 | [JP] | Japan | 61-1969 |

[51] Int. Cl.[4] .......... G01D 9/00

[52] U.S. Cl. .......... 346/1.1; 106/20; 106/22; 8/449; 8/543

[58] Field of Search .......... 106/20, 22; 346/1.1; 8/449, 543

[56] References Cited

U.S. PATENT DOCUMENTS

| | | | |
|---|---|---|---|
| 4,166,044 | 8/1979 | Germonprez et al. | 106/22 |
| 4,188,437 | 2/1980 | Rohowetz et al. | 8/543 |
| 4,365,998 | 12/1982 | Sugiyama et al. | 106/22 |
| 4,471,079 | 9/1984 | Enami | 523/161 |

FOREIGN PATENT DOCUMENTS

| | | |
|---|---|---|
| 143271 | 11/1981 | Japan . |
| 143272 | 11/1981 | Japan . |
| 143274 | 11/1981 | Japan . |
| 143275 | 11/1981 | Japan . |
| 161193 | 12/1981 | Japan . |
| 161479 | 12/1981 | Japan . |

OTHER PUBLICATIONS

Trotman, E. R., "Dyeing and Chemical Technology of Textile Fibres," 6 ed., John Wiley & Sons, (1984) pp. 447–451.
Chem. Abs., vol. 84 (1976) 166071h.
Textilbericht (1977) T621/77.
Derwent Abstract Accession No. 84-316404.
Derwent Abstract Accession No. 84–072546.
Derwent Abstract Accession No. 83–7742116.
Derwent Abstract Accession No. 82–05213J.
Derwent Abstract Accession No. 82–06709E.

*Primary Examiner*—Amelia Burgess Yarbrough
*Attorney, Agent, or Firm*—Fitzpatrick, Cella, Harper & Scinto

[57] ABSTRACT

An ink for use in an ink jet comprises as the main components a reactive dye or a reactive dispersing dye, and a solvent composed mainly of water and an organic solvent which is not reactive with said dye. An ink jet printing method comprises applying an ink for printing by an ink jet system to a cloth having fibers dyeable by a reactive dye, wherein said ink comprises as the main components a reactive dye or a reactive dispersing dye, and a solvent composed mainly of water and an organic solvent which is not reactive with said dye. An ink jet printing method comprising applying an ink for printing by an ink jet system to a cloth having fibers dyeable by a reactive dye followed by a dye-fixing treatment, wherein said ink comprises as the main components a reactive dye or reactive dispersing dye, and a solvent composed mainly of water and an organic solvent which is not reactive with said dye.

11 Claims, No Drawings

INK FOR USE IN INK JET AND INK JET PRINTING METHOD USING THE SAME

BACKGROUND OF THE INVENTION

1. Field of the Invention

The presnt invention relates to a jet ink use in ink jets and, more particularly, to an ink for which is suitable for use in printing patterns on woven or non-woven cloths. The present invention is concerned also with an ink jet printing method which makes use of the ink.

2. Related Background Art

Hitherto, various methods have been used in printing patterns on woven or non-woven cloths, such as roller printing method, screen printing method, transfer printing method, and so forth. It has been proposed also to print patterns on woven or non-woven cloths by means of an ink jet, as disclosed in Japanese Patent Laid-Open No. 59108/1975.

The conventional general printing methods require printing plates such as a plate for printing cylinder and a screen plate, which are generally expensive. The transfer printing method also requires an expensive plate for transferring a sheet of transfer paper. Therefore, these conventional methods are not profitable unless the quantity of the product is sufficiently large. In addition, since the fashion of the print pattern changes rapidly, there is a risk in that a large quantity of the printed products are not sold but kept in stock when production cannot follow the rapid change in the fashion.

The printing method making use of an ink jet has been proposed to deal with these problems. This method, however, suffers from the following disadvantages. Namely, the quality of the print tends to be impaired due to blotting on the cloth, partly because the ink jet printer does not allow the use of an ink having high viscosity and partly because cloth usually has rougher texture than paper, thus making it difficult to print patterns of minute or delicate design. In addition, the discharge of the ink tends to be unstable and the response to high frequency is liable to be impaired depending on the physical property of the ink, owing to the fact that the ink has to be discharged through minute nozzles at high velocity and at high frequency.

It is also known that the print formed by using a conventional ink for ink jet, particularly that printed by use of a reactive dye or reactive disperse dye, exhibits a slow dye-fixing rate and a minimal washing fastness.

SUMMARY OF THE INVENTION

Accordingly, an object of the present invention is to provide an ink for ink jet printing which is capable of overcoming the problems from the view point of economy involved by the conventional printing methods, and also eliminates problems encountered by the known ink jet printing, more particularly obtaining precise and stable prints, and at the same time, achieving a high dye-fixing rate and a high degree of washing fastness of the printed material.

Another object of the present invention is to provide an ink jet printing method which makes use of such ink.

To these ends, according to the present invention, there is provided an ink for use in an ink jet comprising as the main components, a reactive dye or a reactive dispersing dye, and a solvent composed mainly of water and an organic solvent which is not reactive with the dye.

According to another aspect of the present invention, there is provided an ink jet printing method in which an ink for printing is applied by an ink jet system to a cloth having fibers dyeable by a reactive dye, wherein said ink comprises as the main components a reactive or reactive dispersing dye, and a solvent composed mainly of water and an organic solvent which is not reactive with said dye.

According to a further aspect of the present invention, there is provided an ink jet printing method in which an ink for printing is applied by an ink jet system to a cloth having fibers dyeable by a reactive dye followed by a dye-fixing treatment, wherein said ink comprises as the main components a reactive dye or reactive dispersing dye, and a solvent composed mainly of water and an organic solvent which is not reactive with said dye.

DESCRIPTION OF THE PREFERRED EMBODIMENTS

The major feature of the ink in accordance with the present invention resides in that an organic solvent which is not reactive with reactive dye or reactive disperse dye contained in the ink is used as the solvent which constitutes the liquid medium of the ink.

Through an intense study on the printing method of the ink jet type, the inventors have found that superior quality of printing is obtainable when a reactive dye or a reactive dispersion dye is used as the dye for the printing ink together with a polyhydric alcohol or a similar organic solvent which is commonly used as a part of the liquid medium of ink, but in such a case, another new problem may occur, that is, the dye-fixing rate is impaired, and the fastness of the printed material to washing is reduced.

The inferior dye-fixing rate is considered to be attributable to the fact that a part of the dye reacts with the solvent such as polyhydric alcohol during the storage of the ink, resulting in a reduced reactivity with the fibers of the cloth.

Regarding the fastness to washing, it is considered that the water content of the ink which has attached to the cloth is evaporated rapidly, whereas the solvent such as polyhydric alcohol remains on the cloth without being evaporated. The solvent such as polyhydric alcohol then reacts with a part of the dye, during heating or alkali treatment conducted in the post-treatment subsequent to the printing, and so reaction products easily come off when the cloth is washed. The reduce the washing fastness.

In view of the above, the present invention proposes to use, as the organic solvent which constitutes a liquid medium of an ink, an organic solvent which is not reactive with the reactive dye or reactive dispersion dye.

The reactive dye which can be used in the ink of the present invention includes various types of dye which have been used in dyeing fibers or in the conventional printing method, such as water-soluble azo dyes, anthraquinone dyes, phthalocyanine dyes, and so forth, most of which are known.

The reactive dye has a water-soluble radical such as sulfonic acid radical or carboxylic radical, as well as a radical which forms a covalent bond with the fibers through reaction with hydroxyl or amino group in the fiber. Examples of such latter radical are dichlorotriazine, monochlorotriazine, trichloropyrimidine, monochlorodifluoropyrimidine, chlorobenzothiazole, dichloropyridazone, dichloropyridazine, dichloroquinoxaline, epoxy and 3-carboxypyridiniotrazine radicals, and further $-SO_2CH_2CH_2OSO_3H$,
$-SO_2NHCH_2CH_2OSO_3H$,
$-NHCOCH_2CH_2OSO_3H$,
$-NHCOCH_2CH_2Cl$,
$-NHCOCH{=}CH_2$, $-SO_2CH{=}CH_2$,
$-CH_2NHCOCCl{=}CH_2$,
$-NHCOCBr{=}CH_2$,
$-NHCOCH_2Cl$, $-NHCH_2OH$, and $-PO_3H$.

The ink in accordance with the present invention can contain any one of the reactive dyes mentioned above. Amongst these reactive dyes, the following dyes are used preferably.

C.I. Reactive Yellow 2, 3, 13, 15, 17, 18, 23, 24, 37, 42, 57, 58, 64, 75, 76, 77, 79, 81, 84, 85, 87, 88, 91, 92, 93, 95, 111, 115, 116, 130, 131, 132, 133, 135, 136, 137, 139, 140, 142, 143, 144, 145, 146, 147, 148, 151, 162, 163, C.I. Reactive Orange 5, 7, 11, 12, 13, 15, 16, 35, 45, 46, 56, 62, 70, 72, 74, 82, 84, 87, 91, 92, 93, 95, 97, 99, C.I. Reactive Red 3, 13, 16, 21, 22, 23, 24, 29, 31, 33, 35, 45, 49, 55, 63, 85, 106, 109, 111, 112, 113, 114, 118, 126, 128, 130, 131, 141, 151, 170, 171, 174, 176, 177, 180, 183, 184, 186, 187, 188, 190, 193, 194, 195, 196, 200, 201, 202, 204, 206, 218, 221, C.I. Reactive Violet 1, 4, 5, 6, 22, 24, 33, 36, 38, C.I. Reactive Blue 2, 3, 5, 8, 10, 13, 14, 15, 18, 19, 21, 25, 27, 28, 38, 39, 40, 41, 49, 52, 63, 71, 72, 74, 75, 77, 78, 79, 89, 100, 101, 104, 105, 119, 122, 147, 158, 160, 162, 166, 169, 170, 171, 172, 173, 174, 176, 179, 184, 190, 191, 194, 195, 198, 204, 211, 216, 217, C.I. Reactive Green 5, 8, 12, 15, 19, 23, C.I. Reactive Brown 2, 7, 8, 9, 11, 16, 17, 18, 21, 24, 26, 31, 32, 33, C.I. Reactive Black 1, 5, 8, 13, 14, 23, 31, 34, 39 and the like.

When the fiber to be subjected to the printing is made of wool or nylon,

C.I. Reactive Yellow 21, 34, 39, 69, 98, 125, 127,

C.I. Reactive Orange 29, 53, 68,

C.I. Reactive Red 28, 65, 66, 78, 83, 84, 100, 116, 136, 147, 154, 172,

C.I. Reactive Violet 34,

C.I. Reactive Blue 50, 69, 94, 177,

C.I. Reactive Brown 12 and the like are preferably used.

The reactive dispersion dye which can be used for the ink of the present invention may be azo dyes or anthraquinone dyes which exhibit slight solubility in water and which have been used in printing of polyester/cotton mix-spun cloth.

The reactive dispersion dye generally has a molecular structure similar to that of the disperse dye, and has a radical which forms a covalent bond with fiber through reaction with hydroxyl or amino group in the fiber. Examples of such a radical are ethyleneimine, azide, sulfonethyleneimide, dichlorotriazine, monochlorotriazine, trichloropyrimidine, monochloro difluoropyrimidine, chlorobenzothiazole, dichloropyridazone, dichloropyridazine, dichloroquinoxaline, epoxide and 3-carboxypyridiniotriazine radicals, and further $-SO_2CH_2CH_2OSO_3H$,
$-SO_2NHCH_2CH_2OSO_3H$,
$-NHCOCH_2CH_2OSO_3H$,
$-NHCOCH_2CH_2Cl$,
$-NHCOCH{=}CH_2$,
$-SOCH{=}CH_2$,
$-CH_2NHCOCCl{=}CH_2$,
$-NHCOCBr{=}CH_2$,
$-NHCOCH_2Cl$,
$-NHCH_2OH$, $-PO_3H$,
$-SO_2CH_2CH_2OCOCH_3$,
$-SO_2CH_2CH_2OCOOC_4H_9$, and the like.

The ink in accordance with the present invention can contain any one of these reactive dispersion dyes, among which the dyes expressed by the following formulae and their derivatives are used preferably.

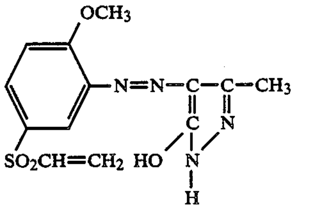
(1)

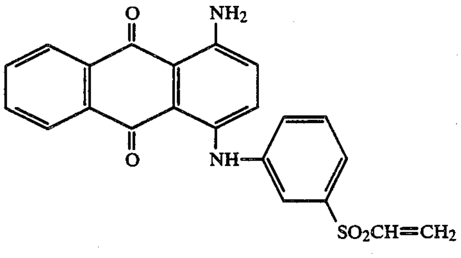
(2)

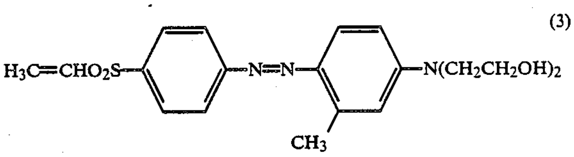
(3)

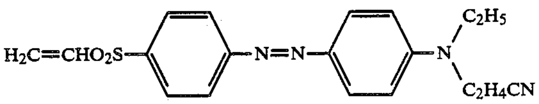
(4)

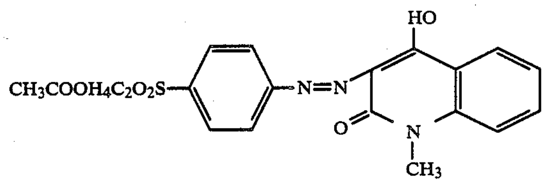
(5)

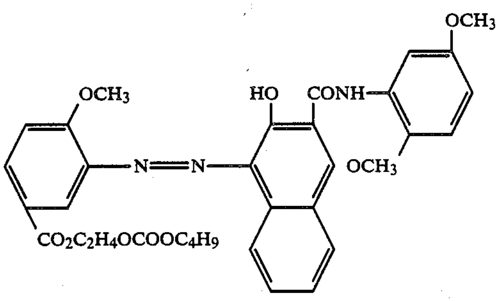
(6)

-continued (7)

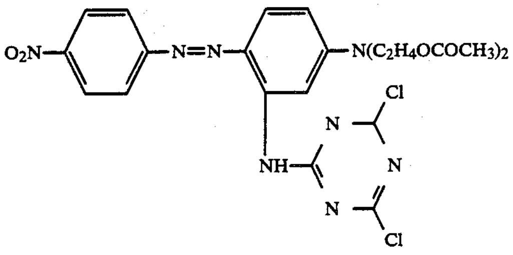

(8)

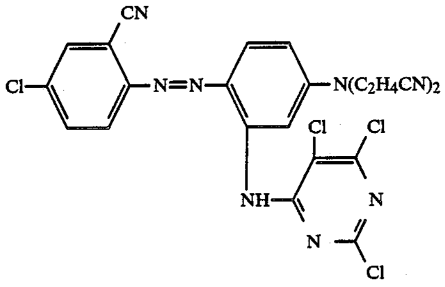

(9)

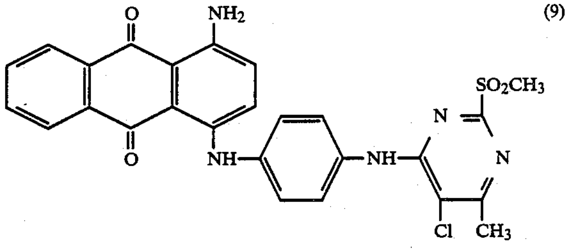

(10)

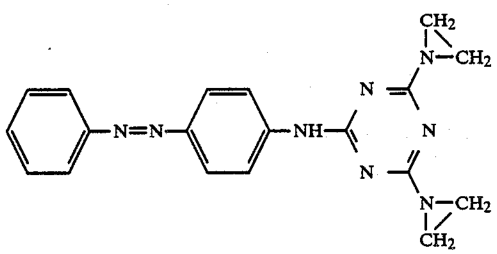

(11)

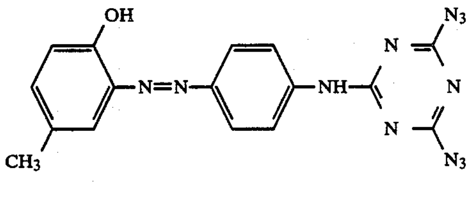

(12)

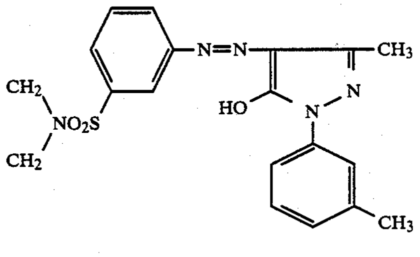

-continued (13)

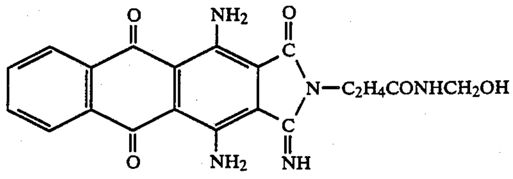

(14)

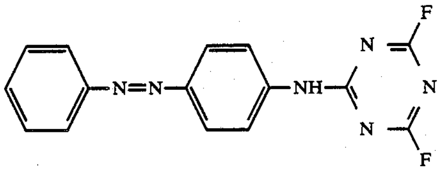

(15)

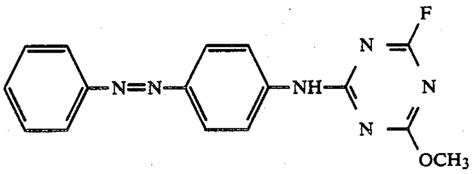

(16)

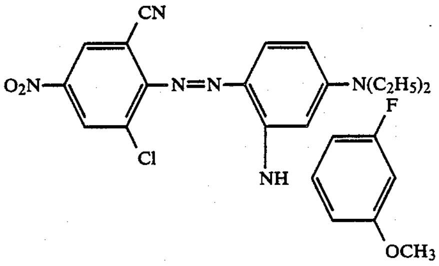

(17)

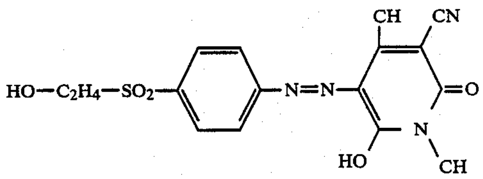

(18)

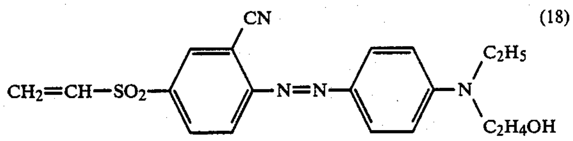

In the ink in accordance with the present invention, the reactive dye or the reactive dispersion dye of the type mentioned above may be dissolved or dispersed in a liquid medium conventionally used in general dyeing or a solvent used for a liquid medium for inks in ink jets, particularly in a medium containing water and an organic solvent. It is necessary that, when the organic solvent is used in a mixture with water, the solvent does not have active hydrogen such as of hydroxyl or amino group which would react with the reactive dye or reactive dispersion dye.

Preferable examples of such an organic solvent are amides such as dimethylformamide and dimethylacetoamide, ketones such as acetone and methyl ethyl ketone, ethers such as tetrahydrofuran and dioxane, and other solvents such as N-methyl-2-pyrrolidone, 1,3-dimethyl-2-imidazolidinone, and so forth. Among these solvents, the following solvents are used most preferably: dialkyl (carbon number 1 to 4) ether of polyoxyethylene (added mol number 1 to 15); dialkyl (carbon number 1 to 4)

ether of polyoxyethylene.oxypropylene block (or random) polymer (added mol number 1 to 15), and the like.

The organic solvent may be used solely, although alternatively, a mixture of two or more of such solvents may be used. Preferably, the organic solvent occupies about 1 to 70 wt % of the ink solvent. The amount of the ink solvent is preferably selected such that the content of the dye explained about ranges between about 0.1 to 15 wt % of the ink.

In addition to the essential components mentioned above, the ink in accordance with the present invention can contain, as required, various additives such as a dispersing agent, surfactant, viscosity adjusting agent, another dye, and so forth. It is also preferred that the additive used in the ink of the present invention is not reactive with the dye mentioned above. This, however, is not essential and the additive may be reactive with the dye, if such an additive is used only in a trace amount.

Important examples of the dispersing agent or surfactant which may be used as required are: anionic dispersing agents or surfactants such as fatty acid salt, alkylsulfate, alkylbenzene sulfonate, alkylnaphthalene sulfonate, dialkylsulfosuccinate, alkylphosphate, naphthalene sulfonate-formalin condensation product, and polyoxyethylene alkylsulfonate; and nonionic dispersing agents or surfactants such as polyoxyethylene alkylether, polyoxyethylene alkylphenylether, polyoxyethylene fatty acid ester, sorbitan fatty acid ester, polyoxyethylene sorbitan fatty acid ester, polyoxyethylene alkylamine, glycerine fatty acid ester, and oxyethylene oxypropylene block polymer.

As the viscosity adjusting agent, a water-soluble natural or synthetic high molecular material such as carboxymethyl cellulose, sodium polyacrylate, polyvinyl pyrrolidone, arabic gum, starch and so forth are preferably used. With or without such viscosity adjusting agent, the viscosity of the ink is adjusted to be 50 cps or less, preferably 1 to 15 cps, at 25° C.

For preparing an ink for use in ink jet system which employs electrostatic charging of the ink, a specific-resistance adjusting agent such as an inorganic salt, e.g., lithium chloride, ammonium chloride and sodium chloride may be added.

When the ink jet is of the type in which the ink is discharged by the action of heat energy, the ink may require adjustment of thermal physical properties such as specific heat, thermal expansion coefficinet, heat conductivity, and so forth.

The ink in accordance with the present invention can contain other types of additive such as an antifoamer, a penetrating agent, an antimold agent and a pH adjuster.

The ink in accordance with the present invention for use in ink jet is generally prepared by mixing or dissolving the essential components as mentioned above with or without addition of the above-mentioned optional component, and then grinding the mixture by a suitable known grinding means such as a ball mill, a sand mill or a speed-line mill. When a reactive dispersion dye is used, the particle size of the dye is selected to be 30 μm or less, preferably 20 μm or less. Too large a particle size of the reactive dispersion dye will cause problems such as blocking of an ink jet nozzle upon recording, non-level dyeing property of the dye in the subsequent dyeing process, and so forth. When a medium capable of dissolving a reactive dispersion dye is used in combination with such a type of dye, the ink composition in accordance with the present invention can be obtained simply by a dissolving operation such as, for example, by heating.

It is also preferred that, during the preparation of the ink of the present invention from the above-mentioned essential components and optional component, the surface tension of the ink is adjusted to range between 30 and 60 dyne/cm. Such an adjustment of the surface tension can be effected without substantial difficulty by those skilled in the art, through suitable selection of the dye and the combination between the dye and the solvent and through addition of a suitable additive.

When the surface tension is below 30 dyne/cm, the ink attaching to a cloth woven from various fibers or a non-woven cloth undesirably blots to make it difficult to print a minute or delicate pattern on the cloth. On the other hand, any level of surface tension exceeding above-mentioned range makes it difficult to form ink droplets of a uniform size at the time of ink discharging. The above-mentioned values of the surface tension are the values as measured at 25° C. by a surface tension meter which is produced by TOA DENPA KOGYO K.K. under the commercial name of KYOWA CBVP SURFACETENSIOMETER A-1.

The ink of the present invention for ink jet is suitable for use in printing of patterns on a woven or non-woven cloth by ink jet printing. More particularly, the ink of the invention is suited to printing on woven or non-woven cloths formed of fibers which are dyeable with the reactive dye, such as cotton, hemp, viscose, wool, silk and nylon, as well as mix-spun woven or non-woven cloths formed of mix-spun yarns of the above-mentioned fibers and synthetic fibers such as polyester fibers, acetate fibers, polypropylene fibers, vinylon fibers and so forth. If necessary, these woven or non-woven cloths may be subjected to a pre-treatment for facilitating printing by ink jet. Such a pretreatment may be effected by applying a water-soluble polymer or a water-dispersible polymer to the surface of the fibers so as to enable the cloth to quickly absorb and hold the ink.

Any type of ink jet system can be used for printing patterns on a woven or non-woven cloth by means of ink jet, provided that it enables the ink to be released from nozzles to reach the woven or non-woven cloth as a target. Typical examples of such ink jet systems are disclosed in, for instance, "IEEE Transactions on Industry Applications" Vol. JA-13, No. 1 (Feb. and Mar., 1977) and also in Nikkei Electronics No. 305 (Dec. 6, 1982).

The ink in accordance with the present invention can conveniently be used in these known ink jet systems. Some of these ink jet systems will be explained hereinafter.

In a first system known as electrostatic attraction type ink jet system, a strong electric field is developed between a nozzle and an accelerating electrode which is disposed several millimeters ahead of the nozzle. Under the influence of the electric field, the ink is successively extracted in the form of particles or droplets from the nozzle and, while the ink droplets fly in the gap between deflecting electrodes, the signal is applied to the deflecting electrodes, so that a desired pattern is printed. Alternatively, the ink droplets are jetted in accordance with the information signal, without being deflected. Either of these methods can be carried out successfully with the ink of the present invention.

In a second system, the ink is pressurized to a high pressure by means of a small-capacity pump, while the nozzle is vibrated by, for example, a quartz oscillator, whereby minute ink droplets are jetted forcibly. Simultaneously with the jetting, the ink droplets are electrostatically charged in accordance with the information signal. The ink droplets thus charged are deflected by amount corresponding to the quantity of the charges, when they pass through a gap between deflecting electrode plates. In a modification which is usually referred to as "microdot ink jet system", the ink pressure and the exciting condition are maintained within given optimum ranges so as to generate two kinds of ink droplets from the tip of nozzle, one being large while the other is small, and only the small droplets are used in the printing. This modification makes it possible to form minute ink droplets by means of nozzles with comparatively large nozzle port diameters as those in ordinary ink jet systems.

A third system employs, for the purpose of pressurizing the ink, piezoelectric elements in place of mechanical ink pressurizing eans such as a pump. The ink is pressurized and jetted from a nozzle by a mechanical displacement of the piezoelectric element energized by an electric signal.

The ink in accordance with the present invention can be used preferably also in an ink jet system disclosed in Japanese Patent Laid-Open No. 59936/1979 in which a drastic change in the volume of the ink is generated by heat energy and a resultant force acts to discharge the ink from a nozzle thereby effecting printing. In this system, a high degree of stability of the ink jet is achieved.

The ink in accordance with the present invention can be used in any one of these known ink jet systems, for the purpose of printing characters and patterns on a woven or non-woven cloth. In a preferred form of the ink in accordance with the present invention, since the surface tension is controlled to fall within a predetermined range, the jetting of the ink droplets from the nozzle is performed in a very stable manner. In addition, the jetted ink attaches appropriately to the cloth without excessive blotting despite the presence of texture in the cloth. Therefore, a clear and minute pattern can be formed through a subsequent dyeing step by an alkali treatment or heat treatment. In contrast, the conventional inks often fail to form fine or delicate pattern sometimes as a result of mis-attaching of the ink dots to the predetermined positions and sometimes as a result of rapid spreading of the ink dots along the texture which permits the ink to blot.

According to the invention, the ink can attach to the cloth precisely in conformity with picture signals. The ink jet, however, merely causes the ink to attach to the cloth. It is, therefore, preferred that a suitable post-treatment be conducted to cause the dye to react with and be fixed to the fibers of the cloth and to remove the dye which has not been fixed. The dye reacts with the fibers during the fixing treatment. In the case of conventional printing inks containing organic solvents such as a polyhydric alcohol reactive with the dye, a part of the dye undesirably reacts with the organic solvent while the ink is stored, resulting in a lowered dye-fixing rate. In addition, the organic solvent such as polyhydric alcohol, which is non-volatile, remains on the cloth to some extent so that it reacts with the dye during the fixing treatment to form a reaction product, resulting in deterioration in the washing fastness. Unlike these conventional inks, the ink in accordance with the present invention can effectively prevent the dye-fixing rate and the washing fastness of the printed cloth from being lowered, by virtue of the fact that an organic solvent which is not reactive with the dye is used.

The reaction fixing of the dye and the removal of the unreacted dye can be effected by known methods such as steaming method, HT steaming method, thermo-fix method, alkali-pad steam method, alkali-blotch steam method, alkali-shock method, alkali cold-fix method, and so forth, followed by washing.

According to the invention, the necessity for the production of an expensive printing plate, which is essential in the ordinary printing methods, is eliminated and the image to be printed can easily be formed and modified by means of a computer. It is therefore possible to cope with a rapid change in the fashion, while dispensing with the conventional expensive plate. This makes it possible to obtain a sufficient profit even by small-quantity production, unlike the conventional printing method which is not paying unless a large quantity of products is produced. The printing by the use of the ink and the printing method in accordance with the present invention can be carried out not only in an industrial scale but also in a house-hold scale for enabling individual to produce a printed cloth having a high washing fastness according to her or his taste.

The invention will become more apparent from the following description of examples and comparison examples in which the contents are expressed either in terms of weight parts (parts) or weight percents (%).

Example 1

| | |
|---|---|
| Reactive dye (C.I. reactive red 24) | 5 parts |
| Tetraethyleneglycol dimethylether | 30 parts |
| Water | 65 parts |

A mixture solution of these materials was adjusted to pH 8.3 using sodium hydroxide and was stirred for 5 hours, followed by filtration by a Fluoropore Filter FP-100 (commercial name, produced by SUMITOMO ELECTRIC IND., LTD), thus obtaining a water-based ink (1A) in accordance with the present invention.

Example 2

| | |
|---|---|
| Reactive dye (C.I. reactive blue 216) | 6 parts |
| Diethyleneglycol diethylether | 6 parts |
| N—methyl-2-pyrrolidone | 15 parts |
| Water | 73 parts |

Using these materials, a water-based ink (1B) of the invention was formed by the same process as that in Example 1.

Example 3

| | |
|---|---|
| Reactive dye (C.I. reactive orange 16) | 4 parts |
| Reactive dye (C.I. reactive yellow 37) | 3 parts |
| Dipropyleneglycol dimethylether | 10 parts |
| 1,3-dimethyl-2-imidazolidinone | 20 parts |
| Nonionic surfactant (commercial name EMULGEN PP-150, produced by KAO CORP.) | 0.2 parts |
| Water | 63 parts |

The mixture solution was adjusted to pH 4.7 by means of acetic acid and stirred for 5 hours, followed by filtration by means of Fluoropore Filter FP-100 (produced by SUMITOMO ELECTRIC IND., LTD), thus forming a water-based ink (1C) in accordance with the invention.

Example 4

| | |
|---|---|
| Reactive dye (C.I. reactive red 180) | 7 parts |
| $H_3C$—$(OC_3H_6)$—$(OC_2H_4)$—$OC_2H_5$ | 20 parts |
| Water | 73 parts |

Using these materials, a water-based ink (1D) in accordance with the invention was formed in the same process as Example 1.

Comparison Example 1

A comparison example (1E) of ink was prepared by the same process as Example 1, except that triethyleneglycol was used instead of tetraethyleneglycol dimethylether.

The properties of the inks of Examples 1 to 4 and the Comparison Example 1 are shown in Table 1.

Example 5

Printing was conducted on different types of cloth by means of an ink jet printer utilizing heat energy as disclosed in Japanese Patent Laid-Open No. 59936/1979, using the water-based inks of Examples 1 to 4 and the Comparison Example 1. After the printing, the cloth was subjected to a fixing treatment by steaming which was conducted in an alkali atmosphere for 1 minute at 100° C., followed by 10-minute washing by a neutral detergent. The kinds of the cloth and the properties of the print on these cloths are shown in Table 2.

TABLE 1

| | Examples 1-4 | | | | Comp. Example 1 |
|---|---|---|---|---|---|
| | Ink 1A | Ink 1B | Ink 1C | Ink 1D | Ink 1E |
| Surface tension (dyne/cm) | 53 | 52 | 48 | 46 | 59 |
| pH | 8.3 | 8.3 | 4.7 | 4.7 | 8.3 |

TABLE 2

| Cloths | Ink 1A Cotton 100% (Georgette) | Ink 1B Polyester 65% Cotton 35% (Broad) | Ink 1C Polyester 50% Cotton 50% (Broad) | Ink 1D Wool 100% (Taffeta) | Ink 1E Cotton 100% (Georgette) |
|---|---|---|---|---|---|
| Blot *1 | o | o | o | o | o |
| Fluctuation in dot dia. *2 | o | o | o | o | o |
| Dye-fixing rate *3 | o | o | o | o | x |
| Washing fastness *4 | o | o | o | o | x |

Example 6

| | |
|---|---|
| Dye of formula (2) | 5 parts |
| Anionic surfactant (dispersing agent) (Commercial name DEMOL N produced by KAO CORP. Tetraethyleneglycol dimethylether | 30 parts |
| Water | 61 parts |

The above-mentioned materials were subjected to dispersing treatment which was conducted for about 36 hours in a alumina ball mill, and the mixture was adjusted to pH 8.3 by sodium hydroxide. The mixture was then subjected again to dispersing treatment which was conducted for 3 hours by means of an alumina ball mill, followed by filtration conducted with Fluoropore Filter FP-1000 (produced by SUMITOMO ELECTRIC IND., LTD.) so as to remove coarse particles exceeding 10 μm, whereby a water-based ink (2A) of the invention was obtained.

Example 7

| | |
|---|---|
| Dye of formula (7) | 4 parts |
| Anionic surfactant (Commercial name NIKKOL OTP-100S, produced by NIKKON CHEMICALS LTD.) | 0.05 parts |
| Anionic surfactant (Commercial name DEMOL C, produced by KAO CORP.) | 1.5 parts |
| Nonionic surfactant (commercial name EMULGEN 981, produced by KAO CORP.) | 0.2 parts |
| Diethyleneglycol diethylether | 6.5 parts |
| N—methyl-2-pyrrolidone | 15 parts |
| Water | 73 parts |

Using these materials, a water-based ink (2B) of the invention was prepared in the same process as Example 6.

Example 8

| | |
|---|---|
| Dye of formula (14) | 7 parts |
| Dye of formula (15) | 2 parts |
| Nonionic surfactant (Commercial name EMULGEN 707, produced by KAO CORP) | 1.5 parts |
| Nonionic surfactant (Commercial name RHEODOL TW-P120, produced by KAO COPR) | 0.2 parts |
| Dipropyleneglycol dimethylether | 10 parts |
| 1,3-dimethyl-2-imidazolidinone | 20 parts |
| Water | 57.5 parts |

These materials as a mixture were subjected to dispersing treatment which was conducted in an alumina ball mill for about 40 hours, and the mixture was adjusted to pH 5.6 by acetic acid. The mixture was then subjected again to dispersing treatment which was conducted for 2 hours, followed by filtration by Fluoropore Filter FP-500 (produced by SUMITOMO ELECTRIC IND., LTD. so as to remove coarse particles exceeding 5 μm, whereby a water-based ink (2C) of the present invention was prepared.

Example 9

| | |
|---|---|
| Dye of formula (9) | 6 parts |
| Anionic surfactant (Commercial name IONET D-2, produced by SANYO CEMICAL INDUSTRIES) | 5.5 parts |
| $H_3C$—$(OC_3H_6)$—$(OC_2H_4)_2$—$OC_2H_5$ | 20 parts |
| Water | 68.5 parts |

Using these materials, a water-based ink (2D) of the invention was prepared by the same process as Example 8.

Comparison Example 2

An ink (2E) as a comparison example was formed by the same materials and the same process as Example 6, except that triethyleneglycol was used in place of tetraethyleneglycol dimethylether in Example 6.

Comparison Example 3

An ink (2F) as a comparison example was formed by the same materials and the same process as Example 8, except that dipropyleneglycol was used in place of dipropyleneglycol dimethylether in Example 8.

The properties of the inks of Examples 6 to 9 and Comparison Examples 2 and 3 are shown in Table 3.

Example 10

Printing was conducted on different types of mix-spun woven cloth by means of an ink jet printer employing heat energy as disclosed in Japanese Patent Laid-Open No. 59936/1979, using the water-based inks 2A-2F) of Examples 6 to 9 and the Comparison Examples 2 and 3. After the printing, each cloth was subjected to a heat-treatment which was conducted for 90 seconds at 180° C., followed by dyeing treatment conducted for 20 seconds at 90° C. in an alkali bath adjusted by sodium carbonate. The cloth was then washed by a neutral detergent, whereby printed cloths were obtained. The results are shown in Table 4.

TABLE 3

| | Ink 2A | Ink 2B | Ink 2C | Ink 2D | Ink 2E | Ink 2F |
|---|---|---|---|---|---|---|
| Surface tension (dyne/cm) | 44 | 50 | 38 | 42 | 55 | 41 |
| pH | 8.3 | 8.3 | 5.6 | 5.6 | 8.3 | 5.6 |

TABLE 4

| Cloths | Ink 2A Polyester 65% Cotton 35% (Satin) | Ink 2B Polyester 65% Cotton 35% (Broad) | Ink 2C Polyester 50% Cotton 50% (Broad) | Ink 2D Polyester 50% Cotton 50% (Knit) | Ink 2E Polyester 65% Cotton 35% (Satin) | Ink 2F Polyester 65% Cotton 35% (Broad) |
|---|---|---|---|---|---|---|
| Blot *1 | o | o | o | o | o | o |
| Fluctuation in dot dia. *2 | o | o | o | o | o | o |
| Dye-fixing rate *3 | o | o | o | o | x | x |
| Washing fastness *4 | o | o | o | o | x | x |

*1 Sharpness of fine line (about 1 mm wide) of the printed pattern was examined by visual check. Mark o represents "good", while x represents "poor".
*2 Dots were printed in a line of 30 cm long at a pitch of 1 mm and the fluctuation of the dot diameter was visually checked. Mark o represents "good", while x represents "poor".
*3 The print immediately after the streaming treatment and the print after 10-minute washing were compared visually. Mark o represents that there was no difference, while x represents that reduction in the color thickness was observed after washing.
*4 The print after additional 1-hour washing by a neutral detergent was visually compared with the print after 10-minute washing.

Mark o represents that there was no difference, while x represents that a reduction in the color thickness was observed when the washing time became longer.

Example 11

A water-based ink (3A) in accordance with the present invention was prepared by the same process as Example 2, except that acetone was used in place of the diethyleneglycol diethylether in Example 2. The ink 3A showed a surface tension of 46 dyne/cm and a pH value of 8.3.

Printing was carried out using the ink 3A on various cloths substantially under the same conditions as Example 5. The results were substantially the same as those obtained with the ink 1B.

Example 12

| | |
|---|---|
| Reactive dye (C.I. reactive red 24) | 2 parts |
| 1,3-dimethyl-2-imidazolidinone | 50 parts |
| N—methyl-2-pyrrolidone | 10 parts |
| Water | 38 parts |

Using these materials, a water-based ink (3B) of the invention was prepared by the same process as Example 1. The ink 3B showed a surface tension of 43 dyne/cm and a pH value of 8.3.

Printing was carried out using the ink 3B on various cloths substantially under the same conditions as Example 5. The results were substantially the same as those obtained with the ink 1A.

Example 13

| | |
|---|---|
| Dye of formula (7) | 10 parts |
| Anionic surfactant (dispersing agent, Commercial name DEMOL N, produced by KAO COPR.) | 5 parts |
| 1,3-dimethyl-2-imidazolidinone | 70 parts |
| Water | 15 parts |

Using these materials, a water-based ink (3C) of the invention was prepared by the same process as Example 6. The ink 3C showed a surface tension of 39 dyne/cm and a pH value of 8.3.

Printing was carried out using the ink 3C on various cloths substantially under the same conditions as Example 10. The results were substantially the same as those obtained with the ink 2A.

Example 14

Five types of water-based ink (3D), (3E), (3F), (3G) and (3H) were prepared by the same process as Example 13, substituting the dyes of formulae (1), (5), (12), (16) and (18) for the dye used in Example 13. These inks showed surface tension and pH value of the samelevels as those shown by the ink 3C.

Printing was carried out using individually these five types of ink 3D to 3H on various cloths substantially under the same conditions as Example 10. The results were substantially the same as those obtained with the ink 3C.

What is claimed is:

1. An ink jet printing method comprising the steps of:
selecting a printing ink mainly composed of a reactive dye or a reactive disperse dye, water and an organic solvent, wherein no organic solvent therein is reactive to said dye;
selecting a cloth recording medium which has not been pretreated with alkali;
jetting droplets of said printing ink onto said non-pretreated cloth recording medium; and
fixing the dye which has been imparted onto the cloth by said jetted droplets by treatment in an alkali atmosphere or an alkali bath.

2. An ink jet printing method according to claim 1, wherein said fiber is anyone selected from a group consisting of cotton, hemp, viscose, wool, silk and nylon.

3. An ink jet printing method according to claim 1, wherein said cloth is a mix-spun woven cloth or a mix-spun non-woven cloth containing at least fibers dyeable by said reactive dye.

4. An ink jet printing method according to claim 1, wherein said organic solvent does not contain active hydrogen.

5. An ink jet printing method according to claim 1, wherein said organic solvent is at least one selected from a group consisting of dimethylformamide, dimethylacetoamide, acetone, methylethylketone, tetrahydrofuran, dioxane, N-methyl-2-pyrrolidone, and 1,3-dimethyl-2-imidazolidinone.

6. An ink jet printing method according to claim 1, wherein said organic solvent is at least one selected from a group consisting of dialkyl (carbon number 1 to 4) ether of polyoxyethylene (added mol number 1 to 15) and dialkyl (carbon number 1 to 4) ether of polyoxyethylene oxypropylene block (or random) polymer (added mol number 1 to 15).

7. An ink jet printing method according to claim 1, wherein said organic solvent occupies 1 to 70 wt % of the whole solvent.

8. An ink jet printing method according to claim 1, wherein the dye content of said ink ranges between 0.1 and 15 wt %.

9. An ink jet printing method according to claim 1, further comprising at least one of a dispersing agent, a surfactant and a viscosity adjuster.

10. An ink jet printing method according to claim 1, wherein the surface tension of said ink is adjusted to range between 30 and 60 dyne/cm at 25° C.

11. An ink jet printing method according to claim 1, wherein the viscosity of said ink is adjusted to be not higher than 50 cps at 25° C.

* * * * *

UNITED STATES PATENT AND TRADEMARK OFFICE
CERTIFICATE OF CORRECTION

PATENT NO. : 4,849,770

DATED : July 18, 1989

INVENTOR(S) : SHOJI KOIKE, ET AL.

It is certified that error appears in the above-identified patent and that said Letters Patent is hereby corrected as shown below:

On the title page:

IN [56] REFERENCES CITED

OTHER PUBLICATIONS, "Derwent Abstract Accession No. 83-7742116." should read --Derwent Abstract Accession No. 83-774216.--.

COLUMN 2

Line 50, "printing, and so reaction products" should read --printing. The reaction products easily come off when the cloth is washed and so reduce the washing fastness.--.

Lines 51-52, Lines 51 and 52 should be deleted.

COLUMN 6

Formula (16),

" 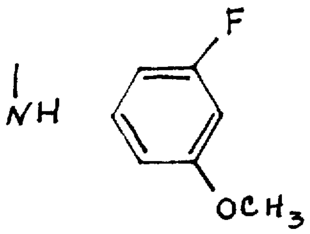 " should read -- 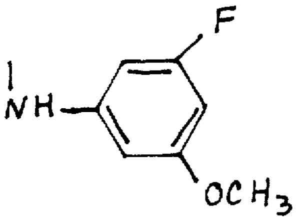 --.

UNITED STATES PATENT AND TRADEMARK OFFICE

CERTIFICATE OF CORRECTION

PATENT NO. : 4,849,770

DATED : July 18, 1989

INVENTOR(S) : SHOJI KOIKE, ET AL.

It is certified that error appears in the above-identified patent and that said Letters Patent is hereby corrected as shown below:

COLUMN 15

Line 20, "anyone" should read --any one--.

Signed and Sealed this

Thirty-first Day of July, 1990

*Attest:*

HARRY F. MANBECK, JR.

*Attesting Officer*

*Commissioner of Patents and Trademarks*